2 Sheets—Sheet 1.

C. A. DURGIN.

Sewing Machine.

No. 567.

Reissued June 15, 1858.

N. PETERS. Photo-Lithographer, Washington, D. C.

Sheets—Sheet 2.
C. A. DURGIN.
Sewing Machine.
No. 567. Reissued June 15, 1858.
Fig. 3
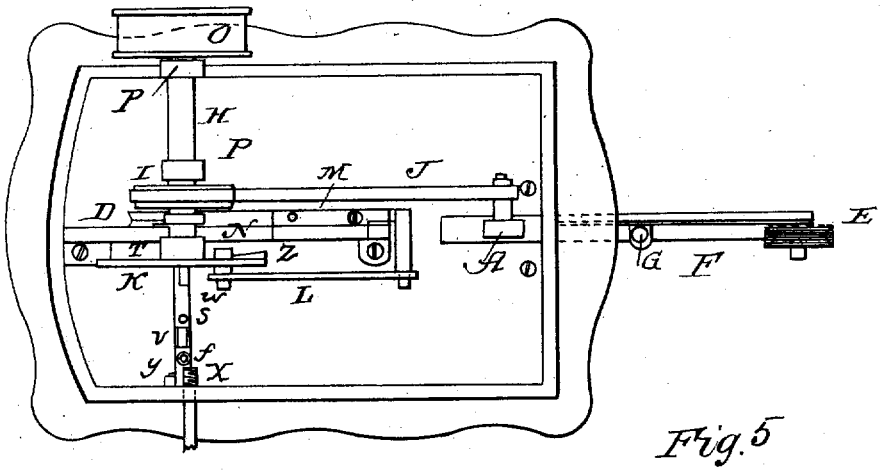
Fig. 5
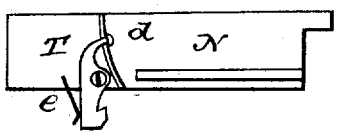
Fig. 7
Fig. 6
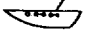
Fig. 4
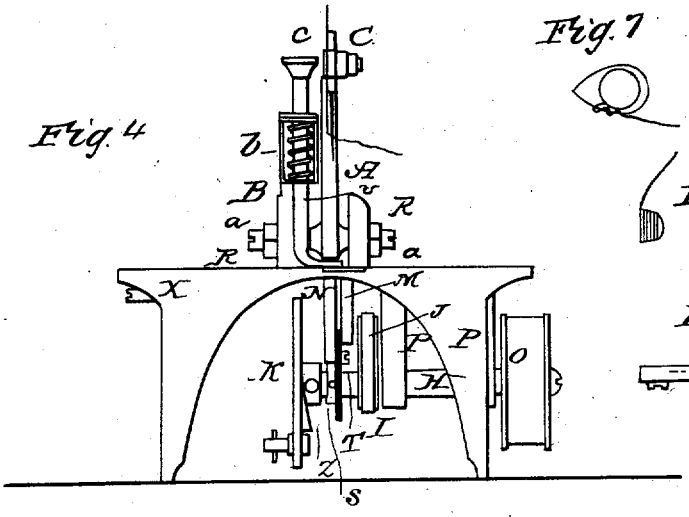
Fig. 8
Fig. 9
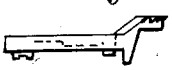
N. PETERS, Photo-Lithographer, Washington, D. C.

UNITED STATES PATENT OFFICE.

C. A. DURGIN, OF NEW YORK, N. Y.

IMPROVEMENT IN SEWING-MACHINES.

Specification forming part of Letters Patent No. 12,902, dated May 22, 1855; Reissue No. 567, dated June 15, 1858.

*To all whom it may concern:*

Be it known that I, CHARLES A. DURGIN, of the city, county, and State of New York, have invented a new and useful Improvement in Sewing-Machines; and I do hereby declare that the following specification, taken in connection with the drawings, is a full, clear, and exact description thereof.

Figure 1:
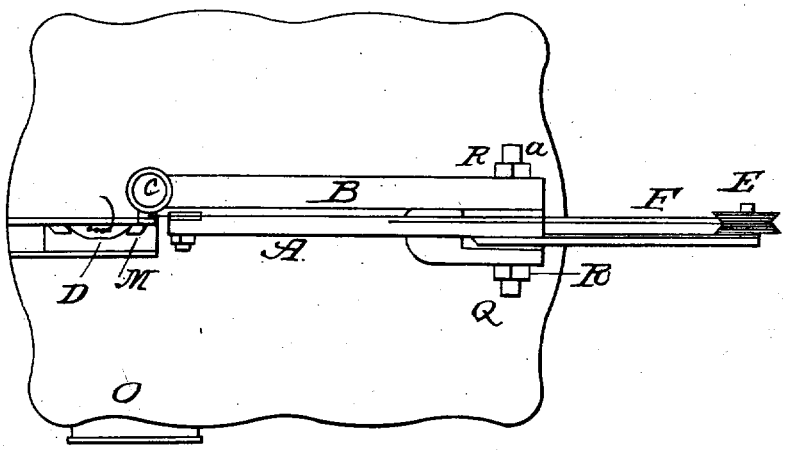
Figure 2:
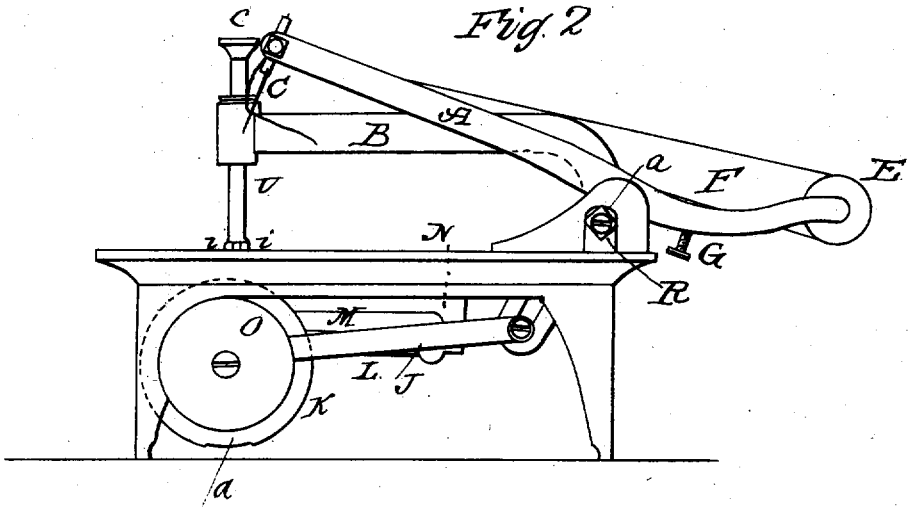

In the said drawings, Figure 1 is a perspective view of the machine from the top. Fig. 2 is a side elevation of the machine. Fig. 3 is an under side view of the machine. Fig. 4 is an end elevation of the machine. Figs. 5, 6, 7, 8, and 9 are parts in detail.

Similar letters of reference indicate like parts in all the drawings.

Prior to the date of my invention many sewing-machines have been devised and used. In those machines working with two threads the mechanism has consisted in trains of wheels and abrupt grooved cams working levers to obtain the proper time and relation of the needle and shuttle to produce sewing. The objections to such machines were chiefly the friction of the many working parts, causing the machines to be difficult of operation, the abrupt motion of the cams, and consequent noise and derangement of the mechanism when subject to rapid action. These difficulties have impeded the introduction of sewing-machines to the extent their merits in other respects demand; and the object of my invention is to obviate the difficulties incident to other machines using a reciprocating shuttle.

To this end the nature of the first part of my invention consists in the employment and use of a vibrating hook to hold the loop of needle-thread during the partial passage of the shuttle through the loop, substantially in the manner and for the purpose hereinafter set forth; and the nature of the second part of my invention consists in combining with the vibrating hook the employment of two continuous rotary motions for the needle and shuttle, without any rest during their movements, for the purpose of rendering a sewing-machine capable of rapid action, simple in construction, and noiseless in its operation, as will be more fully hereinafter specified.

To enable others skilled in the art to make and use my invention, I will proceed to describe it.

In the drawings is represented a shuttle-machine, to the bed-plate of which are hangers P P, with proper journal-boxes, which support a shaft, H, provided at one end with a pulley, O, and also an eccentric, I, crank-wheel K, and a small cam-wheel, S, which constitute the prime movers, all of which parts are plainly shown in Figs. 3 and 4. Attached to and moving with this shaft H is the eccentric-rod J, which communicates motion to the needle-arm A, and also the connecting-rod L, which imparts motion to the shuttle-carrier M. This shuttle-carrier has a cradle for the shuttle, with forks to propel it, as seen in Fig. 1, and is mounted and slides on a plate, N, which is cast or attached to the bed-plate, as shown in Fig. 3, and also in detail, Fig. 5.

To the bed-plate is secured a standard-arm, B, and on which the needle-arm has its fulcrum at the centers *a a*, passing through the arm B and into the needle-lever, which admits a vibrating motion. These centers have check-nuts R R thereon to retain them in proper place when set.

The spool supplying the needle with thread is shown at E, and the thread is passed through a guiding-eye in the needle-holder, and thence through the eye of the needle C, as indicated by the red lines. The tension on the thread is obtained from a spring, F, bearing against the periphery of the spool E, and may be adjusted by the screw G pressing against it.

The shuttle D is made of an almond or partially elliptical shape or form, and has a spool or bobbin, Fig. 8, which rotates upon a pin inserted within it. The tension on the shuttle-thread is obtained by interlacing it through the series of holes sufficiently for sewing tight or loose, as desired, as shown in Figs. 6 and 7. I would here remark that the thread passes out of the shuttle last at the hole nearest the blunt end. Were the process of interlacing reversed, so as to lead out of the point of the shuttle last, there would be loose thread, and consequently loose stitches.

In the standard-arm B there is inserted a sliding rod, U, the lower part of which forms a pressure foot or pad, and receives its pressure from a helical spring, *b*, arranged to press it down against the goods during the progress of sewing. On this rod is a small ball, *c*, for raising it easily, as seen in Fig. 4.

The feed-slide V is seen in Figs. 4 and 9, and is arranged with teeth to catch firmly hold of the cloth. These teeth have a lateral motion only, (which is given them by the cam-surface Z on the crank-wheel K, seen in Figs. 3 and 4,) and are arranged upon both sides of the needle, in order to have the cloth propelled in a straight line. The small helical spring Y serves to reach the slide after the cam Z has forced it along.

Directly back of the feed-slide there is a screw, X, (seen in Figs. 3 and 4,) which serves to regulate the extent of backward motion, and consequently the length of stitch. The rear end of this slide rests upon a screw with a head sufficiently large to hold it in place, while it allows it to work freely back and forth, which screw is seen at *f* in Figs. 3 and 9. The front end of the feed-slide rests upon the plate on which the shuttle works.

The plate W, through which the needle passes, is seen partially in Fig. 3, and is fastened upon a pin. (Seen at *g* in Fig. 3 and the dotted lines 9.)

During the revolution of the crank-wheel K the plate (seen at *h* in Fig. 9) at a proper time drops into a notch or recess out in the wheel (seen at *a* in Fig. 2) which, by means of the pressure-foot, forces the cloth upon the teeth, while the cam-surface carries the cloth along the desired distance for the stitch. The cloth is then thrown off the teeth by the periphery of the wheel raising the plate *h*. In the foot-pad or pressure-bar U there are cut grooves to prevent the teeth from being dulled by usage, as seen in Fig. 2 at *i i*. Motion being given the shaft H, it imparts a vertical reciprocating movement to the needle which passes through the cloth, and in its backward motion causes a loop of thread. As soon as the needle is drawn back far enough to form a bow of thread the vibrating hook T, which is seen in Figs. 4 and 5, and which is worked by a small cam-pin in the collar S, as seen in Figs. 3 and 4, shuts in between the thread and the needle against a small yielding spring, *d*, in Fig. 5, and holds the thread down until the shuttle has passed nearly through the loop, when the cam-pin releases its hold on the hook, which is forced back by a small spring, *e*, (seen in Fig. 5,) while the forward motion of the shuttle, in connection with the final upward motion of the needle, causes the two threads to be drawn sufficiently tight to form the stitch.

Having thus described my improved sewing-machine, what I claim, and desire to secure by Letters Patent, is—

1. The vibrating hook, or its mechanical equivalent, for holding down the thread during the partial passage of the shuttle through the loop, when arranged and operating substantially as set forth.

2. In combination with the vibrating hook or its equivalent, the employment of two continuous rotary motions, one working the needle, the other the shuttle, and this for the purpose of producing sewing without any rest on either the shuttle or needle in their movements, thereby rendering a sewing-machine capable of rapid action, simple in construction, and noiseless in its operation, substantially as set forth.

CHARLES A. DURGIN. [L. S.]

Witnesses:
D. G. ROWLANDS,
ALLEN LAPHAM.